United States Patent
Wolf et al.

(10) Patent No.: US 11,268,534 B2
(45) Date of Patent: Mar. 8, 2022

(54) BLOWER WHEEL AND POWER TOOL WITH AN INTERNAL COMBUSTION ENGINE AND A BLOWER WHEEL

(71) Applicant: Andreas Stihl AG & Co. KG, Waiblingen (DE)

(72) Inventors: Andreas Wolf, Leutenbach (DE); Wolfgang Weissert, Winnenden (DE); Volker Lempges, Eschfeld (DE); Helmut Zimmermann, Berglen (DE); Günter Wolf, Oppenweiler (DE); Holger Vollmer, Hilzingen (DE); Marcel Förster, Schwaikheim (DE); Ute Dawin, Waiblingen (DE); Jonas Lank, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 930 days.

(21) Appl. No.: 15/376,717

(22) Filed: Dec. 13, 2016

(65) Prior Publication Data
US 2017/0167500 A1    Jun. 15, 2017

(30) Foreign Application Priority Data
Dec. 15, 2015  (DE) .................. 10 2015 016 482.1

(51) Int. Cl.
*F04D 29/28* (2006.01)
*F04D 29/44* (2006.01)
(Continued)

(52) U.S. Cl.
CPC .............. *F04D 29/281* (2013.01); *F01P 1/02* (2013.01); *F02B 63/02* (2013.01); *F04D 29/023* (2013.01);
(Continued)

(58) Field of Classification Search
CPC ........ H02K 7/14; H02K 7/145; H02K 7/1815; H02K 9/06; H02K 21/22; F01P 1/02;
(Continued)

(56) References Cited

U.S. PATENT DOCUMENTS

| 2,778,961 A | 1/1957 | Jepson et al. |
| 3,952,712 A | 4/1976 | Hermanson |

(Continued)

FOREIGN PATENT DOCUMENTS

| CN | 2714858 | 8/2005 |
| CN | 101809293 | 8/2010 |

(Continued)

*Primary Examiner* — Shawki S Ismail
*Assistant Examiner* — Monica Mata
(74) *Attorney, Agent, or Firm* — Gudrun E. Huckett

(57) ABSTRACT

A blower wheel is provided with a base member having an axis of rotation and with a rotor of a generator, wherein the rotor is fixedly secured on the blower wheel. At least one magnet is arranged on the rotor. An inertia ring is fixedly secured on the base member at a spacing to the at least one magnet. The inertia ring is made of a first material having a first density and the base member is made of a second material having a second density. The first density is greater than the second density. An internal combustion engine is provided with such a blower wheel.

22 Claims, 7 Drawing Sheets

(51) Int. Cl.
*F04D 29/02* (2006.01)
*H02K 7/18* (2006.01)
*F04D 29/66* (2006.01)
*F04D 29/62* (2006.01)
*F02B 63/02* (2006.01)
*F01P 1/02* (2006.01)
*H02K 21/22* (2006.01)
*H02K 9/06* (2006.01)
*H02K 7/02* (2006.01)
*F16F 15/315* (2006.01)
*F04D 25/08* (2006.01)

(52) U.S. Cl.
CPC ......... *F04D 29/441* (2013.01); *F04D 29/624* (2013.01); *F04D 29/662* (2013.01); *F04D 29/668* (2013.01); *H02K 7/1815* (2013.01); *H02K 9/06* (2013.01); *H02K 21/22* (2013.01); *F04D 25/084* (2013.01); *F05D 2260/43* (2013.01); *F16F 15/315* (2013.01); *H02K 7/02* (2013.01); *H02K 2213/03* (2013.01)

(58) Field of Classification Search
CPC ...... F02B 63/02; F04D 29/023; F04D 29/281; F04D 29/441; F04D 29/624; F04D 29/662; F04D 29/668; F16F 15/315
USPC .......................................................... 310/50
See application file for complete search history.

(56) References Cited

U.S. PATENT DOCUMENTS

| | | | |
|---|---|---|---|
| 4,423,345 A | 12/1983 | Nilsson | |
| 4,709,669 A | 12/1987 | Wissmann et al. | |
| 5,375,637 A | 12/1994 | Matsumoto et al. | |
| 5,755,194 A * | 5/1998 | Moorman | F01M 1/04 123/196 W |
| 6,583,965 B1 * | 6/2003 | Forbord | G11B 25/043 360/294.4 |
| 7,859,124 B2 | 12/2010 | Maier et al. | |
| 2005/0046191 A1 * | 3/2005 | Cole | H02K 1/2786 290/1 A |
| 2005/0126529 A1 | 6/2005 | Higuchi | |
| 2006/0022540 A1 | 2/2006 | Leufen et al. | |
| 2011/0081236 A1 | 4/2011 | Geldenhuys | |
| 2012/0177515 A1 * | 7/2012 | Schmid | F04D 29/662 417/423.14 |
| 2013/0081296 A1 * | 4/2013 | Catauro | D06F 58/20 34/130 |
| 2015/0130307 A1 | 5/2015 | Sherman et al. | |
| 2015/0176596 A1 * | 6/2015 | Gossling | F01P 1/06 417/423.1 |

FOREIGN PATENT DOCUMENTS

| | | |
|---|---|---|
| DE | 102007037581 | 2/2008 |
| JP | 5-38111 | 2/1993 |
| JP | 2014114769 | 6/2014 |
| TW | 201507758 | 3/2015 |

* cited by examiner

BLOWER WHEEL AND POWER TOOL WITH AN INTERNAL COMBUSTION ENGINE AND A BLOWER WHEEL

BACKGROUND OF THE INVENTION

The invention relates to a blower wheel comprising a base member having an axis of rotation, wherein the blower wheel comprises a rotor of a generator, wherein the rotor is secured fixedly on the blower wheel and wherein at least one magnet is arranged on the rotor.

The invention further relates to a power tool with an internal combustion engine and with a blower wheel.

Blower wheels are used, for example, in internal combustion engines for conveying cooling air. In this context, usually a blower wheel is fixedly secured on the crankshaft of the internal combustion engine. Such a blower wheel serves usually simultaneously as a flywheel for the internal combustion engine.

U.S. Pat. No. 7,859,124 discloses an internal combustion engine arranged in a hand-guided portable power tool and provided with a blower wheel secured on its crankshaft. The rotor of an alternating current generator is integrated into the blower wheel. In operation, the alternating current generator produces energy that is supplied to at least one electrical consumer of the power tool, in particular the spark plug of the power tool.

In order to achieve a uniform running of the internal combustion engine, a great flywheel mass is desirable for the blower wheel serving as a flywheel. At the same time, the total weight of the internal combustion engine and thus also of the blower wheel, in particular for use in a power tool that is carried by the operator in operation, should be as low as possible in order to ensure ergonomic working with the power tool.

It is the object of the invention to provide a blower wheel of the aforementioned kind that enables uniform running of an internal combustion engines while providing a minimal total weight. A further object of the invention resides in providing a power tool comprising an internal combustion engine with a blower wheel that has a minimal total weight and whose internal combustion engine is running smoothly.

SUMMARY OF THE INVENTION

In accordance with the invention, this is achieved in regard to the blower wheel in that on the base member of the blower wheel an inertia ring is secured at a spacing to the magnet and in that the density of the material of the inertia ring is greater than the density of the material of the base member of the blower wheel.

In accordance with the invention, this is achieved in regard to the power tool in that on the base member of the blower wheel an inertia ring is secured at a spacing to the magnet and in that the density of the material of the inertia ring is greater than the density of the material of the base member of the blower wheel.

The blower wheel according to the invention is provided with an inertia ring fixed on the base member of the blower wheel. The inertia ring is comprised of a material whose density is greater than the density of the material of the base member of the blower wheel. The base member of the blower wheel can be comprised of a material with comparatively minimal density. In this way, a reduced total weight of the blower wheel is achieved. In order to achieve in spite of this a uniform running behavior of an internal combustion engine on which the blower wheel is mounted, the inertia ring is comprised of a material with greater density than that of the base member. In this way, a greater moment of inertia results. Accordingly, a more uniform running behavior of the blower wheel is achieved. Moreover, the blower wheel has a greater rotation energy when rotating. This is beneficial for use of the blower wheel as a flywheel. Due to the greater density of the material of the inertia ring, the inertia ring can have a great mass while having a small volume. In this way, installation space can be saved. Accordingly, the moment of inertia of the blower wheel due to the inertia ring can be increased by using a small installation space. According to the invention, the inertia ring is fixed at a spacing to the magnet. In this way, an influence of the inertia ring on the magnetic field of the magnet is substantially or completely avoided. No magnetic return is caused by the inertia ring.

Advantageously, it is provided that the blower wheel in addition to the inertia ring is provided with a metallic magnetic return ring (magnetic yoke) for reinforcing the magnetic flux of the magnet. The inertia ring can be positioned independent of the metallic magnetic return ring on the base member of the blower wheel. The shape of the inertia ring can be matched, for example, to the existing installation space. The shape of the inertia ring can be designed independent of the shape of the magnetic return ring.

Advantageously, it is provided that the inertia ring is arranged radially outside of the magnetic return ring. In this way, a great moment of inertia of the blower wheel will result. Since the radial spacing of a mass point from the axis of rotation is applied squared in the calculation of the magnitude of the moment of inertia, an arrangement of the mass point of the inertia ring radially outside of the magnetic return ring is particularly beneficial. Accordingly, with a comparatively minimal total weight of the blower wheel, a great moment of inertia of the blower wheel can be achieved.

Advantageously, it is provided that the base member at one side is provided with an annular wall. The annular wall extends in a ring shape about the axis of rotation. The at least one magnet is advantageously arranged in radial direction inside the annular wall. Advantageously, the annular wall separates the inertia ring from the at least one magnet. Advantageously, the inertia ring is arranged in the radial direction outside of the annular wall. Advantageously, the annular wall is part of a receptacle for the inertia ring.

The base member of the blower wheel comprises a first side and a second side. Advantageously, on the second side flow guiding elements are arranged. It can be provided that flow guiding elements are arranged additionally also on the first side of the base member of the blower wheel. Advantageously, the inertia ring is arranged on the first side of the blower wheel. In this context, the first side of the blower wheel is preferably the side which is facing the crankcase upon installation of the blower wheel on the crankshaft of an internal combustion engine.

The flow guiding elements on the second side of the blower wheel are in particular arranged in a circular ring area of the base member. The center point of the circular ring area is in this context advantageously positioned on the axis of rotation. An inner radius of the circular ring area corresponds advantageously to at most 0.5 times the outer radius of the base member. An outer radius of the circular ring area corresponds in particular at least to 0.9 times the outer radius of the base member. In this way, the flow guiding elements extend in radial direction across a large portion of the base member. The circular ring area therefore occupies more than half of a circular surface that is delimited by the outer radius of the base member. Accordingly, the flow guiding elements can achieve a good cooling air conveyance upon rotation of the blower wheel.

The base member comprises an imaginary terminal plane which is perpendicular to the axis of rotation. The terminal plane is arranged on the first side of the base member. The terminal plane extends in this context through the outermost boundary, viewed in axial direction, of the base member. Advantageously, the base member is provided with a flow guiding surface on the second side of the base member. The flow guiding surface is advantageously designed such that the spacing of the flow guiding surface from the terminal plane increases with decreasing spacing of the flow guiding surface to the axis of rotation. In this way, the blower wheel in operation can suck in air from the second side of the base member in axial direction of the axis of rotation, the air being deflected by the flow guiding surface in a beneficial way in a direction radial to the axis of rotation. Accordingly, a comparatively high conveying performance of the blower wheel can be achieved. Advantageously, it is provided that the shape of the flow guiding surface at least partially corresponds to the shape of an outer circumferential surface of a truncated circular cone.

On the side which is facing the flow guiding surface, the contour of the inertia ring follows advantageously the contour of the flow guiding surface. The flow guiding surface is advantageously designed to be fluidically beneficial and the contour of the inertia ring is preferably matched to the contour of the flow guiding surface. Accordingly, the installation space that is available can be utilized well and, at the same time, a high moment of inertia of the flywheel can be achieved.

Advantageously, it is provided that between the first side and the second side of the base member a partition, or separating wall, is arranged. The inertia ring is advantageously arranged adjacent to the separating wall. Preferably, the contour of the inertia ring follows, on the side which is facing the flow guiding surface, the contour of the separating wall. The side of the inertia ring which is adjacent to the separating wall extends advantageously parallel to the separating wall. The side of the inertia ring extends advantageously at a slant to the axis of rotation of the blower wheel, i.e., at an angle of less than 90° relative to the axis of rotation.

The separating wall delimits advantageously at least partially a receptacle for the inertia ring. Advantageously, it is provided that the flow guiding surface is formed at least partially by the separating wall of the base member. Advantageously, the contour of the separating wall follows on the first side of the base member a contour of the flow guiding surface on the second side of the base member. In this way, a thickness of the separating wall measured in axial direction is constant at least in the area of the inertia ring. In this way, the inertia ring can be arranged in a material-saving and weight-saving way on the base member of the blower wheel. This is advantageous in particular when using the blower wheel in a hand-guided power tool. Advantageously, the inertia ring is contacting and rests on the separating wall.

Advantageously, it is provided that the first side of the base member comprises an outer wall. The outer wall extends advantageously annularly about the axis of rotation along the circumference of the base member. Advantageously, the outer wall delimits at least partially the receptacle for the inertia ring.

Advantageously, it is provided that the outer radius of the inertia ring amounts to 0.8 times to 1 times the outer radius of the base member. In this way, the mass of the inertia ring is arranged in an area of the base member of the blower wheel that is located in radial direction far outwardly. In this way, a comparatively minimal total weight of the blower wheel causes a great moment of inertia of the blower wheel.

Advantageously, it is provided that the inertia ring comprises at least one section in which a thickness of the inertia ring measured in the direction of the axis of rotation decreases in radial direction outwardly. The thickness of the inertia ring is measured in this context in the direction of the axis of rotation of the blower wheel. Due to the configuration of the inertia ring as a separate component that advantageously has no other function but to increase the moment of inertia, the shape of the inertia ring and in particular the thickness of the inertia ring can be matched well to the installation space which is provided within the base member of the blower wheel. Due to the thickness of the inertia ring which decreases radially in outward direction, the contour of a side face of the inertia ring that is facing the base member can follow the contour of the separating wall at the first side of the base member. Accordingly, the installation space which is available within the base member can be optimally utilized. Due to the decreasing thickness of the inertia ring in radial outward direction a side face of the inertia ring that is facing away from the base member can be positioned, in the installed state of the inertia ring, in a plane that is perpendicular to the axis of rotation. In this way, a compact and pleasing configuration of the blower wheel can be achieved. Advantageously, the planar side face of the inertia ring forms a portion of the exterior side of the blower wheel.

Advantageously, it is provided that the thickness of the inertia ring at the outer radius of the inertia ring amounts to approximately 60% to 80% of the thickness at the inner radius of the inertia ring. Advantageously, it is provided that the side face of the inertia ring which is facing the base member tapers conically. Advantageously, the inertia ring is centered by means of the side face on the base member. In this way, the inertia ring can be arranged in a simple way on the base member. At the same time, an arrangement of the inertia ring in a precisely predetermined position on the base member of the blower wheel is possible. In this way, good running behavior of the blower wheel is achieved.

Advantageously, the inertia ring is attached with an adhesive on the base member. In this way, the attachment of the inertia ring on the base member is possible in a simple way.

For a power tool with an internal combustion engine it is provided that the power tool comprises a blower wheel according to the invention. The power tool may also comprise a blower wheel according to the invention with one of the disclosed further advantageous embodiments or with any combination of several of the disclosed advantageous embodiments.

Advantageous configurations can be obtained by any combination of the elements of the disclosed embodiments.

DESCRIPTION OF THE PREFERRED EMBODIMENTS

Figure 1:
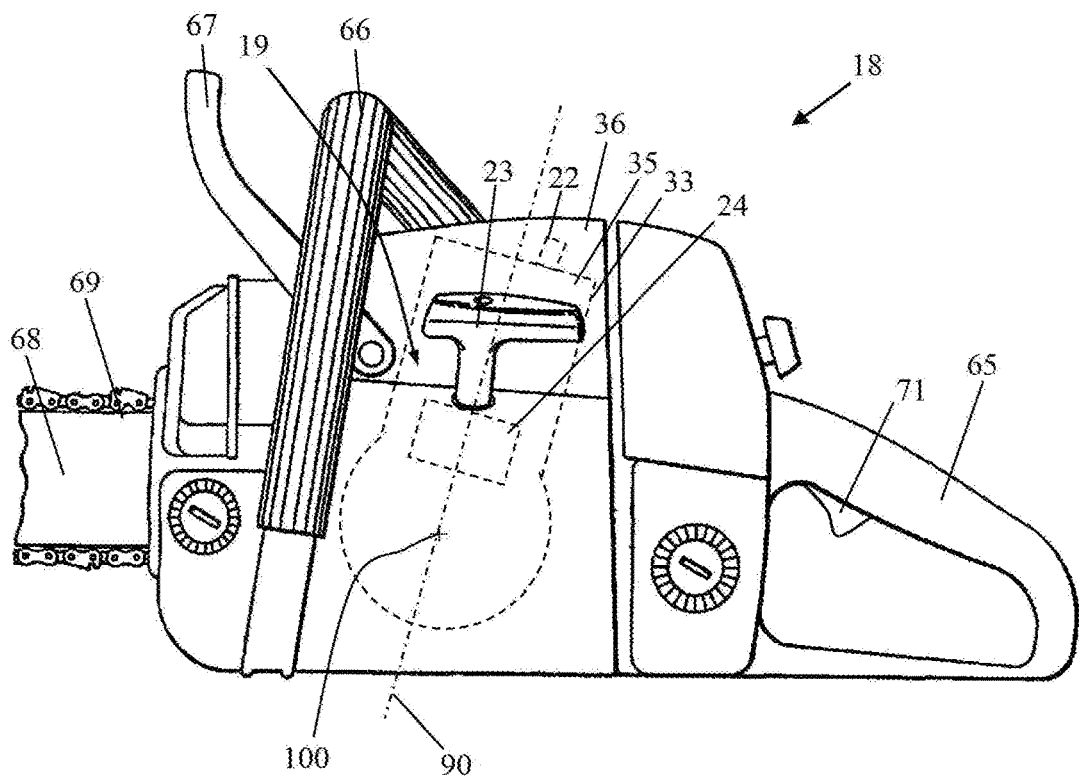
FIG. 1 is a schematic partial illustration of a side view of a motor chainsaw.

FIG. 1 shows a motor chainsaw as an embodiment of a power tool 18. The power tool 18 is a hand-guided, in particular portable, power tool. The power tool 18 can also be a cut-off machine, a blower, a trimmer or the like in the form of a portable, hand-guided power tool.

The motor chainsaw comprises a motor housing 36 on which a guide bar 68 is secured. A saw chain 69 is guided in circulation about the guide bar 68. In the motor housing 36, an internal combustion engine 19 is arranged which is indicated in FIG. 1 with dashed lines. The internal combustion engine 19 drives the saw chain 69 in operation in circulation about the guide bar 68. In the embodiment, the internal combustion engine 19 is configured as a mixture-lubricated two-stroke engine. The internal combustion engine 19 can also be designed as a four-stroke engine, in particular a mixture-lubricated four-stroke engine. The internal combustion engine 19 is advantageously an engine operating with a low-pressure injection device. The fuel is therefore supplied to the internal combustion engine 19 at minimal pressure, advantageously at a pressure of 0 bar relative to ambient pressure to 2 bar overpressure relative to ambient pressure, by means of a fuel valve. For guiding the motor chainsaw in operation, on the motor housing 36 a rear handle 65 is arranged on which a throttle trigger 71 is pivotably supported. The internal combustion engine 19 can be operated by means of the throttle trigger 71.

For guiding the motor chainsaw, there is also a grip 66 provided that is extending across the motor housing 36 of the motor chainsaw. The motor chainsaw comprises a hand guard 67 which is extending on the side of the grip 66 facing the guide bar 68. The hand guard 67 serves advantageously for triggering a braking device, not illustrated in the embodiment.

Figure 2:
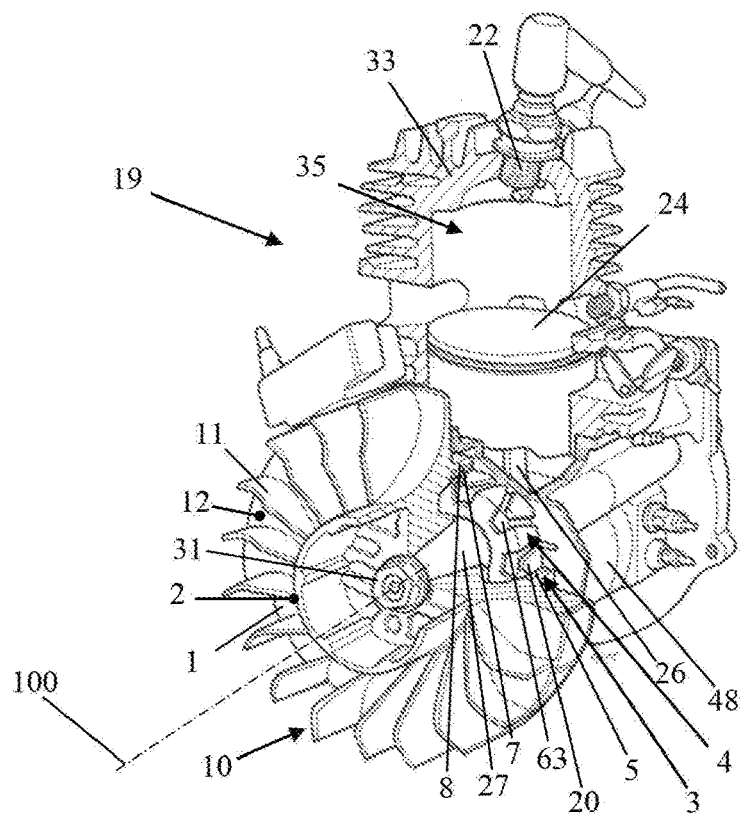
FIG. 2 is a schematic perspective and partially sectioned illustration of an internal combustion engine of the motor chainsaw according to FIG. 1.

FIG. 2 shows the internal combustion engine 19 of FIG. 1 in a schematic illustration. The internal combustion engine 19 comprises a cylinder 33 with a piston 24 supported reciprocatingly therein and driving a crankshaft 27 by means of connecting rod 26. The crankshaft 27 rotates in operation about axis of rotation 100. In the cylinder 33 a combustion chamber 35 is formed which is delimited by the piston 24. Spark plug 22 projects into the combustion chamber 35. The spark plug 22 serves for igniting a mixture which is compressed within the combustion chamber 35.

A blower wheel 1 is provided that rotates together with the crankshaft 27 and is secured fixedly on the crankshaft 27. For fixation of the blower wheel 1, a fixation nut 31 is provided which is screwed onto one end of the crankshaft 27 and secures thereby the blower wheel 1 axially on the crankshaft 27. The blower wheel 1 serves for conveying cooling air to the internal combustion engine 19. The blower wheel 1 serves at the same time as a flywheel. Moreover, the blower wheel 1 comprises a rotor 3 of a generator 4.

The blower wheel 1 comprises a base member 2. The base member 2 of the blower wheel 1 comprises a first side 9 illustrated in FIG. 6. The first side 9 in the installed state of the blower wheel 1 is facing the internal combustion engine 19. As illustrated in FIG. 2, the base member 2 of the blower wheel 1 has a second side 10. The second side 10 of the base member 2 in the installed state of the blower wheel 1 is facing away from the internal combustion engine 19. On the first side 9 of the base member 2 a magnetic return ring (magnetic yoke) 7 is arranged. The magnetic return ring 7 is part of the rotor 3. The rotor 3 is secured on the base member 2 of the blower wheel 1. In addition to the magnetic return ring 7, the rotor 3 of the generator 4 comprises at least one magnet 5. In the embodiments, the magnet 5 is arranged on the magnetic return ring 7. However, it can also be provided that a magnet is arranged on the outer circumference of the base member 2. In the embodiments, several magnets 5 are distributed evenly spaced about the circumference of the magnetic return ring 7. Each magnet 5 is immediately contacting (resting on) the magnetic return ring 7. The magnetic return ring 7 is metallic and serves for reinforcing the magnetic flux of the magnet 5.

The internal combustion engine 19 comprises a crankcase 48 in which the crankshaft 27 is rotatably supported. On the crankcase 48 a stator 20 of the generator 4 is fixedly secured. The stator 20 comprises at least one coil 63. The blower wheel 1 engages across the circumference of the stator 20 so that the stator 20 is positioned in radial direction inside the rotor 3. Upon rotation of the blower wheel 1 about the axis of rotation 100, the magnets 5 of the rotor 3 induce voltage in the coil 63 of the stator 20.

Figure 3:
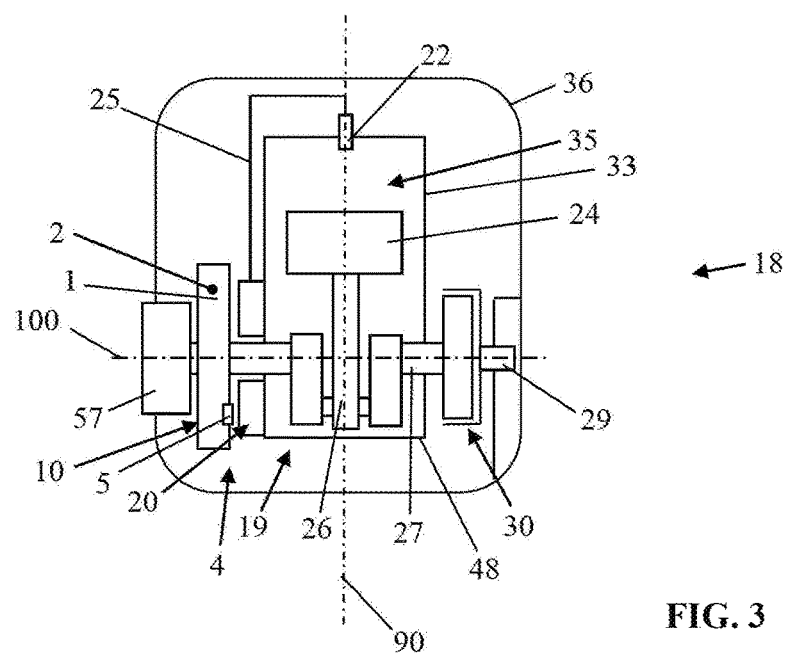
FIG. 3 is a schematic illustration of a section view of the motor chainsaw of FIG. 1.

FIG. 3 shows in schematic illustration a section view of the motor chainsaw according to FIG. 1. The section plane is defined by the axis of rotation 100 and a longitudinal cylinder axis 90 which is oriented perpendicular to the axis of rotation 100. The power tool 18 comprises a starter device 57 for starting the internal combustion engine 19. The starter device 57 can be, for example, a cable pull starter but also an electrically operated starter device. The rotational movement of the crankshaft 27 that is generated by the internal combustion engine 19 is transmitted by means of a centrifugal clutch 30 onto a drive pinion 29 and is used in the embodiment for driving the saw chain 69 illustrated in FIG. 1. As shown in FIG. 3, the blower wheel 1 is arranged in the direction of the axis of rotation 100 between the starter device 57 and the internal combustion engine 19. The generator 4 is arranged between the internal combustion engine 19 and the base member 2 of the blower wheel 1. The stator 20 of the generator 4 is fixedly secured on the crankcase 48 of the internal combustion engine 19. The rotor 3 (FIG. 2) of the generator 4 is fixedly secured on the base member 2 of the blower wheel 1.

Figure 4:
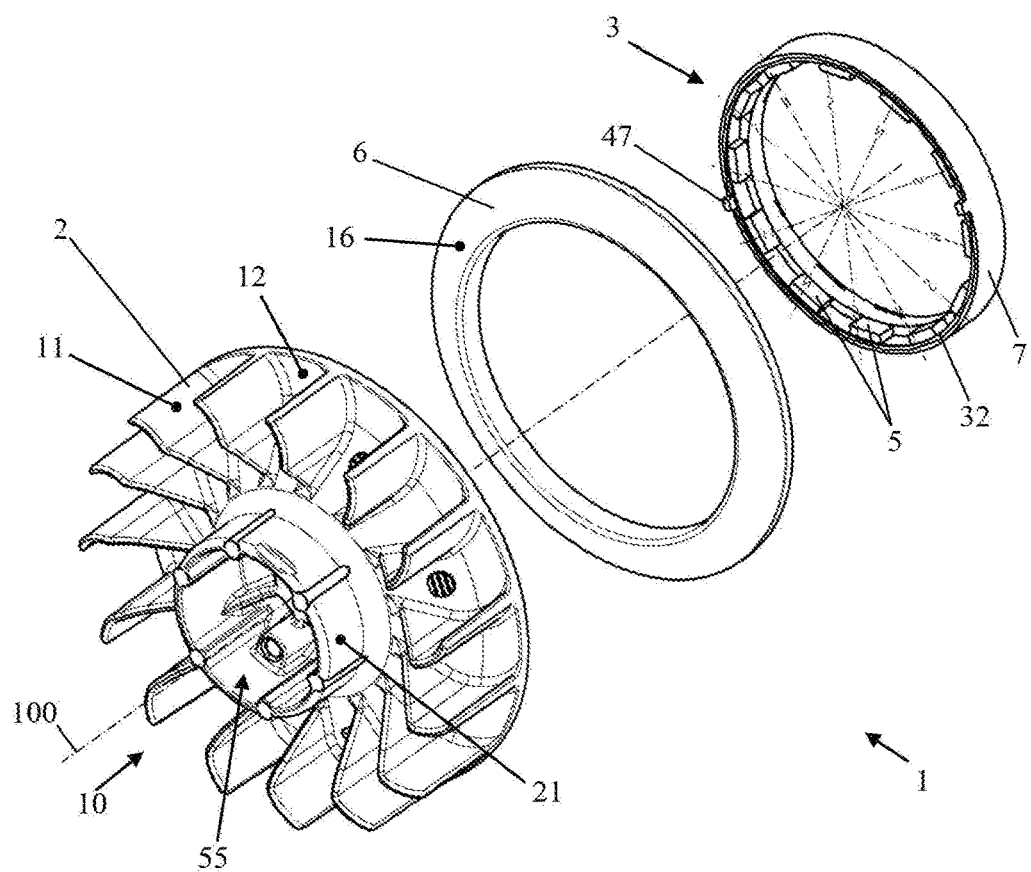
FIG. 4 is an exploded illustration of base member, inertia ring, and magnetic return ring of a blower wheel of the motor chainsaw according to FIG. 1.

FIG. 4 shows an exploded illustration of the blower wheel 1. The blower wheel 1 comprises the base member 2, a fastening ring 32, and an inertia ring 6. On the fastening ring 32 the magnetic return ring 7 and the magnets 5 are secured. The fastening ring 32 is comprised of an electrically insulating material.

The inertia ring 6 is embodied separate from the magnetic return ring 7. In a section plane perpendicular to the axis of rotation 100, the inertia ring 6 is of a circular ring shape. The density of the material of the inertia ring 6 is greater than the density of the material of the base member 2 of the blower wheel 1. The base member 2 is comprised advantageously of lightweight construction material, in particular lightweight metal such as aluminum or magnesium, or of plastic material. In the embodiments, the base member 2 is comprised of magnesium. The inertia ring 6 is comprised advantageously of steel. Other materials for the inertia ring 6 can be selected, for example, die-cast zinc, copper, ceramic material, titanium or the like. The inertia ring 6 can be comprised of metallic or non-metallic materials. The density of the material of the inertia ring 6 amounts advantageously to at least two times, in particular at least three times, preferably at least four times, the density of the material of the base member 2.

The magnets 5 of the magnetic return ring 7 are preferably arranged, uniformly spaced from each other, on the inner circumferential edge of the magnetic return ring 7. As a whole, twelve magnets 5 are provided. The magnets 5 and the magnetic return ring 7 form together the rotor 3 of the generator 4 illustrated in FIGS. 2 and 3. In the embodiment, the rotor 3 comprises also the fastening ring 32.

The second side 10 of the base member 2 is facing away from the inertia ring 6 and the magnetic return ring 7. In the area of the axis of rotation 100, a receptacle 55 is formed preferably on the second side 10 of the base member 2. The receptacle 55 is a substantially of a hollow-cylindrical shape. The receptacle 55 serves in the embodiment for receiving a follower 46, illustrated in FIG. 11, of the starter device 57 that is schematically illustrated in FIG. 3. The function of the follower 46 will be explained in more detail in the following. The receptacle 55 illustrated in FIG. 4 comprises an outer wall 21 which is formed substantially in accordance with the outer circumferential surface of a cylinder.

On the second side 10 of the base member 10, flow guiding elements 11 are arranged. As a whole, fifteen flow guiding elements 11 are uniformly arranged relative to each other at uniform angular spacings relative to the axis of rotation 100 on the second side 10 of the base member 2. The flow guiding elements 11 extend in radial direction outside of the outer wall 21. The flow guiding elements 11 are of a vane-shape design. They extend substantially radially relative to the axis of rotation 100. The flow guiding elements 11 are attached to a flow guiding surface 12 of the blower wheel 1. The flow guiding elements 11 generate a cooling air flow for the internal combustion engine 19 in operation upon rotation of the blower wheel 1.

Figure 5:
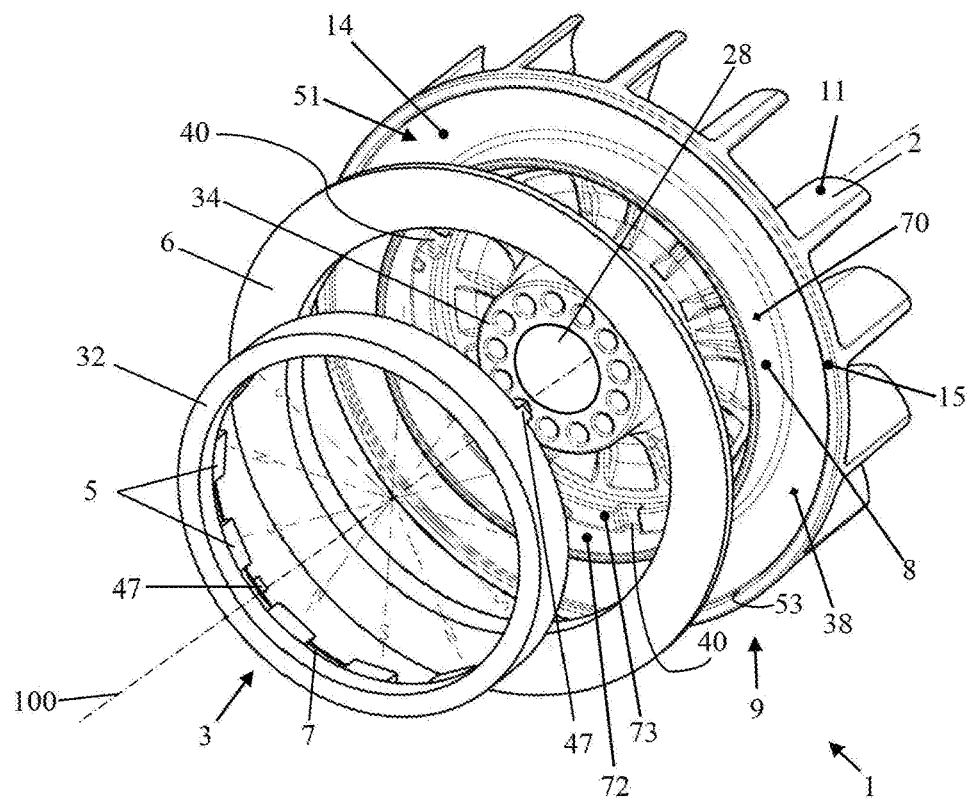
FIG. 5 is another exploded illustration of base member, inertia ring, and magnetic return ring of the blower wheel of the motor chainsaw according to FIG. 1.

FIG. 5 shows the blower wheel 1 of FIG. 4 in an exploded view from the side which is facing the crankcase 48 (FIG. 2). The base member 2 is therefore illustrated in a perspective view onto its first side 9. The base member 2 comprises an outer wall 15. The outer wall 15 extends annularly about the axis of rotation 100 along the outer circumference of the base member 2 and, in radial direction relative to the axis of rotation 100, forms part of the outermost boundary of the base member 2. The outer wall 15 comprises a radial inwardly positioned flank 53. The radial inwardly positioned flank 53 of the outer wall 15 delimits a receptacle 51 for the inertia ring 6. The receptacle 51 is designed as an annular recess in the first side 9 of the base member 2.

The base member 2 comprises a partition or separating wall 14 between its first side 9 and its second side 10. The separating wall 14 comprises on the first side 9 of the base member 2 a first face 38. The first face 38 of the separating wall 14 in the assembled state of the blower wheel 1 is facing the inertia ring 6. The first face 38 of the separating wall 14 forms the bottom of the receptacle 51 for the inertia ring 6 in the base member 2.

The base member 2 of the blower wheel 1 comprises preferably an annular wall 8. The annular wall 8 extends annularly about the axis of rotation 100. The annular wall 8 is positioned in radial direction within the outer wall 15. In the assembled state of the blower wheel 1, the annular wall 8 is positioned between the inertia ring 6 and the magnetic return ring 7. The annular wall 8 is positioned in the assembled state of the blower wheel 1 between the inertia ring and the fastening ring 32.

The annular wall 8 comprises a radial outwardly positioned side 70. The outwardly positioned side 70 of the annular wall 8 extends in axial direction of the axis of rotation 100 and in a circular shape so as to surround the axis of rotation 100. The outwardly positioned side 70 of the annular wall 8 delimits the receptacle 51 for the inertia ring 6. The outwardly positioned side 70 of the annular wall 8 extends in the embodiment parallel to an inwardly positioned flank 53 of the outer wall 15. Between the outwardly positioned side 70 of the annular wall 8 and the inwardly positioned flank 53 of the outer wall 15 the first face 38 of the separating wall 14 is extending. The receptacle 51 for the inertia ring 6 is delimited by the inwardly positioned flank 53 of the outer wall 15, the first face 38 of the separating wall 14, and the outwardly positioned side 70 of the annular wall 8.

The annular wall 8 comprises a radial inwardly positioned side 72. The radial inwardly positioned side 72 of the annular wall 8 extends preferably parallel to the radial outwardly positioned side 70 of the annular wall. The radial inwardly positioned side 72 is positioned radially within the outwardly positioned side 70. In the assembled state of the blower wheel 1, the fastening ring 32 is contacting (rests on) the radial inwardly positioned side 72 of the annular wall 8.

In radial direction inwardly relative to the radial inwardly positioned side 72 of the annular wall 8, a projection 73 of the base member 2 adjoins the radial inwardly positioned side 72. The projection 73 extends in a circular ring shape about the axis of rotation 100 in a plane which is oriented substantially perpendicular to the axis of rotation 102 and to the annular wall 8. In the assembled state of the blower wheel 1, the magnetic return ring 7 is contacting (rests on) the projection 73. In the assembled state of the blower wheel 1, the fastening ring 32 is contacting (rests on) the projection 73.

The projection 73 comprises in the embodiment several first positioning members 40 for positioning the magnetic return ring 7 in the base member 2. The first positioning member 40 in the embodiment is designed as a recess in the projection 73. The recess which forms the first positioning member 40 extends substantially in the direction of the axis of rotation 100. On the magnetic return ring 7 several second positioning members 47 are formed in correspondence with the first positioning members 40. In the embodiment according to FIG. 5, the second positioning members 47 are designed as noses which are projecting past the fastening ring 32 in axial direction. In the assembled state of the blower wheel 1, the noses of the second positioning members 47 engage the first positioning members 40. In this way, the fastening ring 32 is positioned with form-fit action in the base member 2. The magnetic return ring 7 and the magnets 5 are secured fixedly on the fastening ring 32. By positioning the fastening ring 32 relative to the base member 2, positioning of the magnetic return ring 7 and of the magnets 5 relative to the base member 2 is realized at the same time. In the embodiment, three positioning members 40 and three positioning members 47 are arranged in uniform distribution about the inner circumference of the annular wall 8.

In the area of the axis of rotation 100, the base member 2 of the blower wheel 1 has a hub 34. The hub 34 comprises in the embodiment a conical fastening opening 28 which completely penetrates the base member 2 in the direction of the axis of rotation 100. Another, in particular a round, configuration of the fastening opening 28 can however be advantageous also. Also, a form-fit connection, in particular by means of a feather key, can be advantageous.

Figure 6:
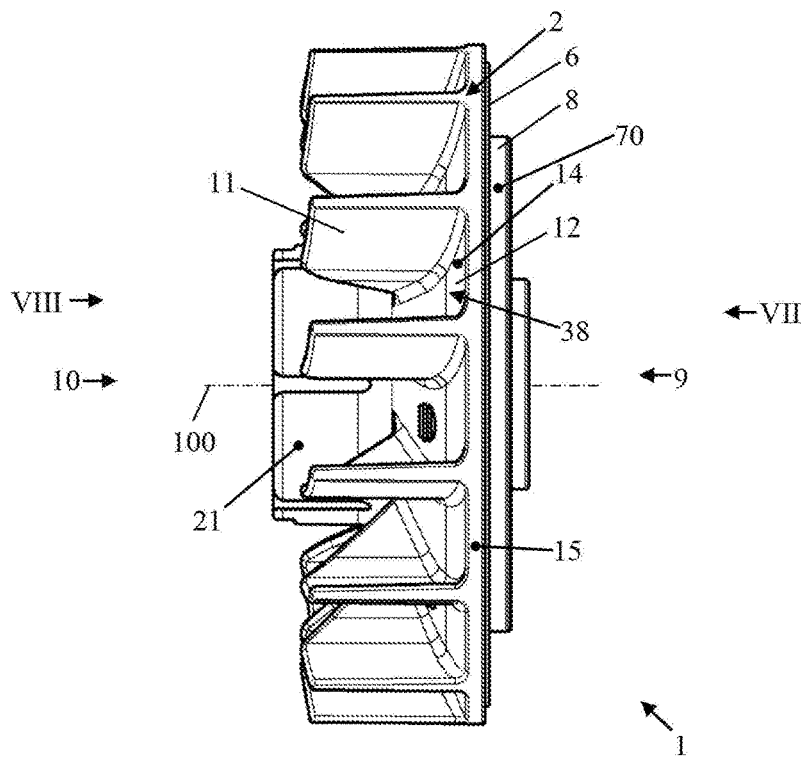
FIG. 6 is a side view of the blower wheel of FIG. 4 in an illustration viewed in a direction perpendicular to the axis of rotation.

FIG. 6 shows a side view of a blower wheel 1 in the direction perpendicular to the axis of rotation 100. The outer wall 21 of the receptacle 55 for the follower 46 projects in direction of the axis of rotation 100 on the second side 10 of the base member 2 past the flow guiding elements 11. The annular wall 8 projects preferably in the direction of the axis of rotation 100 on the first side 9 of the base member 2 past the inertia ring 6 and the outer wall 15. In the assembled state of the blower wheel 1, the inertia ring 6 projects in the direction of the axis of rotation 100 on the first side 9 of the base member 2 past the outer wall 15 of the base member 2.

Figure 7:
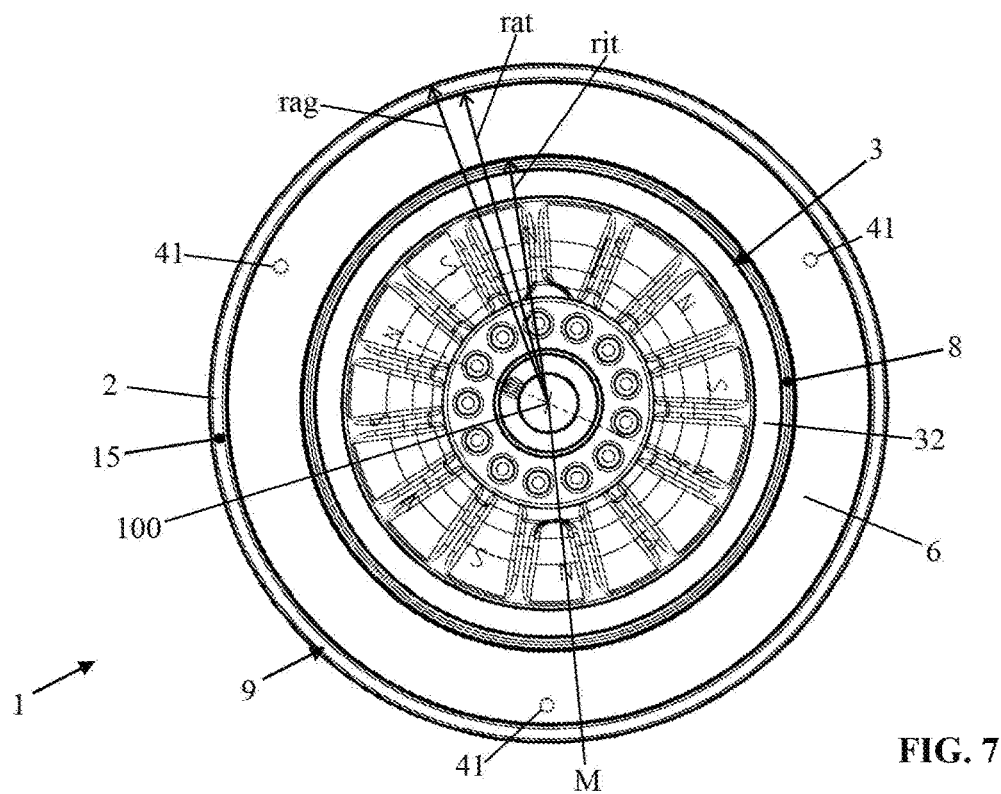
FIG. 7 is a side view of the blower wheel in the direction of arrow VII of FIG. 6.

FIG. 7 shows a view of the blower wheel 1 in the direction of the axis of rotation 100 onto the first side 9 of the base member 2. The base member 2 comprises a center point M. Center point M is positioned on the axis of rotation 100. In a view in the direction of the axis of rotation 100, the base member 2 is circular. The base member 2 is delimited in radial direction of the axis of rotation 100 by the outer wall 15. The base member 2 comprises an outer radius rag. The outer wall 15 extends in an annular shape about the axis of rotation 100 in accordance with the outer radius rag of the base member 2. The inertia ring 6 is positioned radially within the outer wall 15. The inertia ring 6 is arranged radially outside of the annular wall 8. The inertia ring 6 comprises an outer radius rat. The outer radius rat of the inertia ring 6 is advantageously 0.8 times to 1 times the outer radius rag of the base member 2. In the embodiment of FIG. 7, the outer radius rat of the inertia ring 6 is more than 0.9 times the outer radius rag of the base member 2.

The inertia ring 6 comprises an inner radius rit. The inner radius rit of the inertia ring 6 amounts advantageously to at least 0.6 times the outer radius rag of the base member 2. In the embodiment according to FIG. 7, the inner radius rit of the inertia ring 6 amounts to more than 0.7 times the outer radius rag of the base member 2. The inner radius rit amounts advantageously to less than 0.9 times, in particular less than 0.8 times, the outer radius rag of the base member 2.

The inertia ring 6 is arranged adjacent to the first face 38, illustrated in FIG. 5, of the separating wall 14 of the base member 2. In FIG. 7, knobs 41 of the first face 38 of the separating wall 14 are illustrated schematically in dashed lines. The knobs 41 are advantageously fixedly arranged on the first face 38 of the separating wall 14. The knobs 41 project on the first side 9 of the base member 2 in the direction of axis of rotation 100 past the first face 38 of the separating wall 14. In the embodiments, the knobs 41 project in the direction of the axis of rotation 100 on the first side 9 of the base member 2 approximately 0.2 mm past the first face 38 of the separating wall 14. In the view of the base member 2 in the direction of the axis of rotation 100 according to FIG. 7, the knobs 41 have a circular contour. A diameter of the circular contour of the knobs 41 measured perpendicular to the axis of rotation 100 amounts to approximately 1 mm to 3 mm in the embodiments. In the embodiments, the inertia ring 6 is resting exclusively on the knobs 41 directly on the base member 2. In axial direction, the knobs 41 form a stop for the inertia ring 6. In the embodiments, precisely three knobs 41 are provided. In this way, a three-point support for the inertia ring 6 is provided. The three knobs 41 are positioned on a common circle and spaced relative to each other at angular spacings of approximately 120° relative to the axis of rotation 100. However, it can also be provided that the inertia ring 6 is contacting directly the first face 38 of the separating wall 14.

As illustrated in FIG. 7, the inertia ring 6 is arranged radially outside of the fastening ring 32 and thus radially outside of the magnetic return ring 7.

Figure 8:
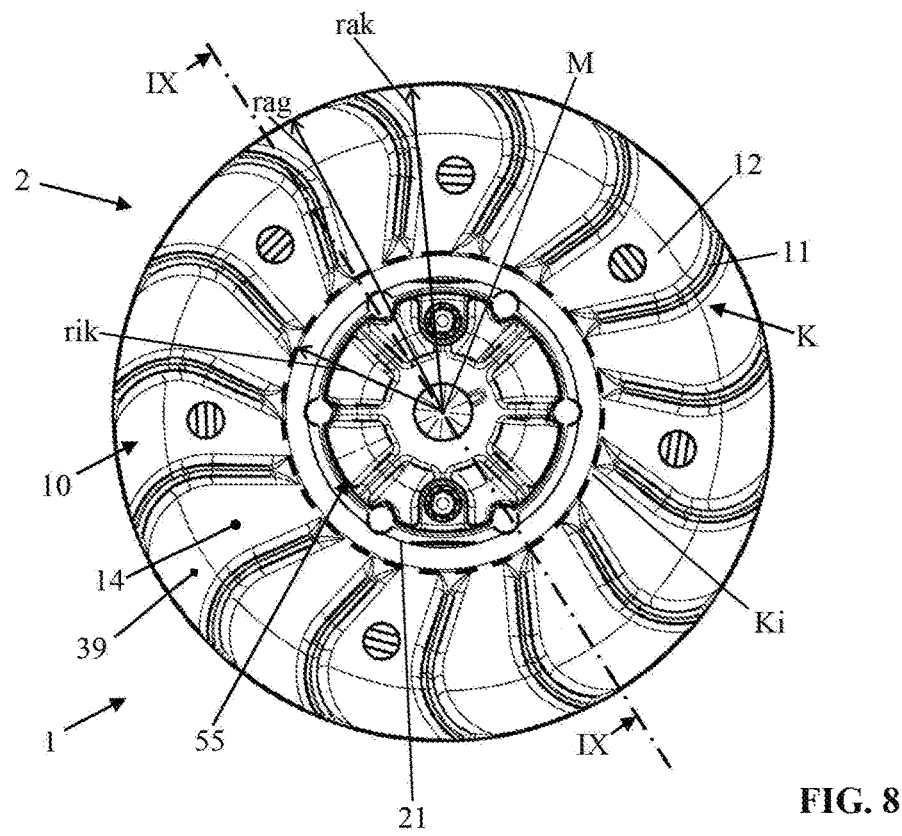
FIG. 8 is a schematic side view of the blower wheel in the direction of arrow VIII of FIG. 6.

FIG. 8 shows a view of the blower wheel 1 of FIG. 4 in the direction of the axis of rotation 100 onto the second side 10 of the base member 2. The flow guiding elements 11 of the base member 2 are arranged in a circular ring area K of the base member 2. The circular ring area K comprises a center point M which is positioned on the axis of rotation 100. On its radially inwardly positioned side, the circular ring area K is delimited by an inwardly positioned rim Ki. The inwardly positioned rim Ki is illustrated in FIG. 8 in dashed line. The inwardly positioned rim Ki has an inner radius rik. The inner radius rik of the circular ring area K corresponds advantageously to at most 0.5 times the outer radius rag of the base member 2. In the embodiment according to FIG. 8, the inner radius rik of the circular ring area K corresponds advantageously to 0.4 times to 0.5 times the outer radius rag of the base member 2. The circular ring area K has an outer radius rak. The outer radius rak of the circular ring area K corresponds preferably to at least 0.9 times the outer radius rag of the base member 2. In the embodiment according to FIG. 8, the outer radius rak of the circular ring area K corresponds to 1.0 times the outer radius rag of the base member. The circular ring area K is positioned radially outside of the outer wall 21 of the receptacle 55 for the follower 46 illustrated in FIG. 11.

Figure 9:
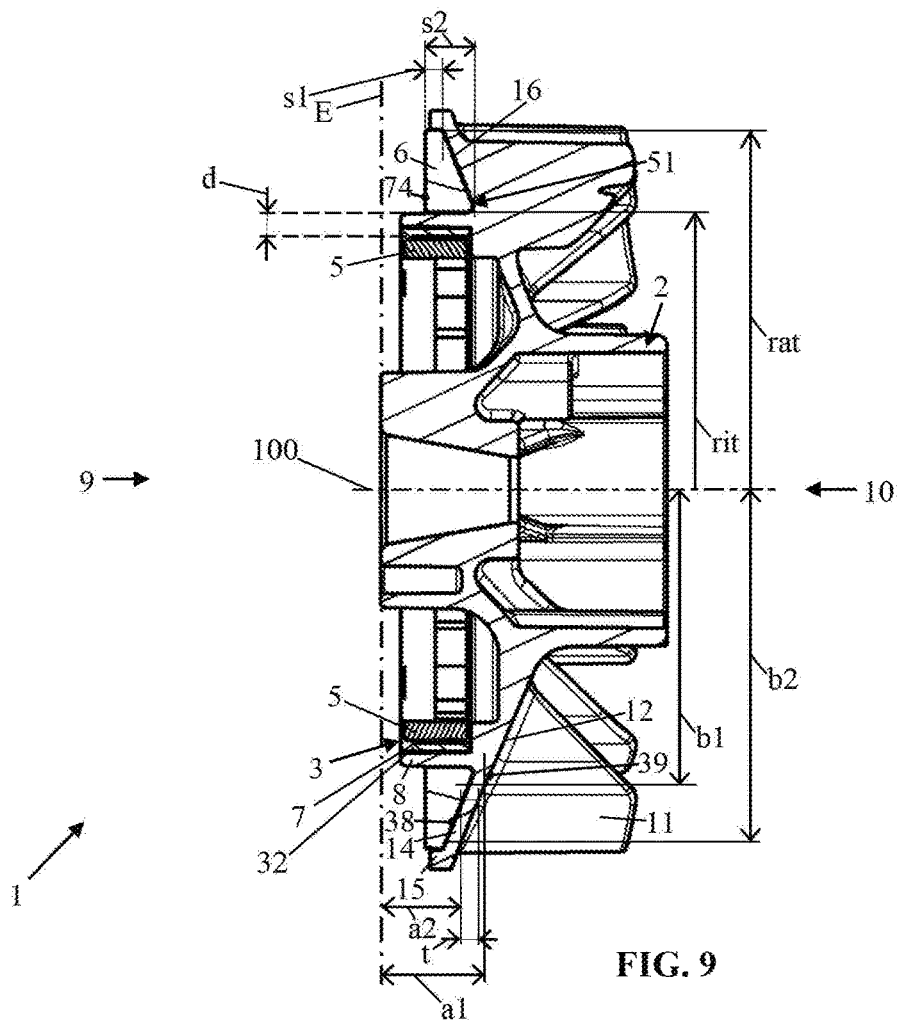
FIG. 9 is a section view along the section line IX-IX of FIG. 8.

FIG. 9 shows a section along the section line IX-IX of FIG. 8. The section plane contains the axis of rotation 100. The inertia ring 6 and the magnetic return ring 7 in the embodiment are separated from each another by the annular wall 8. The inertia ring 6 and the fastening ring 32 are separated from each other by the annular wall 8. The magnets 5 are contacting (rest on) the magnetic magnetic return ring 7. The magnets 5 directly contact the magnetic return ring 7.

The inertia ring 6 is fixedly secured at a spacing d relative to the magnet 5 on the base member 2 of the blower wheel 1. The spacing d is measured perpendicular to the axis of rotation 100. The spacing d amounts advantageously to at least 0.5 mm, in particular at least 1 mm. The magnet 5 is arranged radially within the annular wall 8. The magnet 5 is arranged radially within the magnetic return ring 7.

The base member 2 of the blower wheel 1 comprises an imaginary terminal plane E. The imaginary terminal plane E is illustrated in FIG. 9 in dashed line. The imaginary terminal plane E is positioned perpendicular to the axis of rotation 100. The imaginary terminal plane E is arranged on the first side 9 of the base member 2. The imaginary terminal plane E extends through the outermost boundary of the base member 2 in the direction of the axis of rotation 100. The flow guiding surface 12 on the second side 10 of the base member 2 comprises a spacing a1 relative to the imaginary terminal plane E. The spacing a1 is measured in the direction of the axis of rotation 100 at a location of the flow guiding surface 12 that has a spacing B1 relative to the axis of rotation 100. At a spacing B2 relative to the axis of rotation 100, the flow guiding surface 12 has a spacing a2 relative to the imaginary terminal plane E.

In the embodiment, the spacing B2 of the flow guiding surface 12 relative to the axis of rotation 100 is greater than the spacing B1. The spacing a1 is greater than the spacing a2. The spacing a1, a2 of the flow guiding surface 12 relative to the terminal plane E increases with decreasing spacing B1, B2. The father outwardly a point is positioned in the radial direction on the flow guiding surface 12, the closer it is to the terminal plane E, i.e., the closer it is to the crankcase 48 of the internal combustion 19 on which the blower wheel 1 is secured. The flow guiding surface 12 is slanted in radial direction outwardly in the direction of the crankcase 48.

As can be seen in FIG. 9 and in particular when looking at FIGS. 4, 8, and 9 together, the shape of the flow guiding surface 12 in the embodiment corresponds to the shape of an outer circumferential surface of a truncated circular cone.

The separating wall 14 comprises a second face 39. The second face 39 of the separating wall 14 is facing away from the inertia ring 6 and from the magnetic return ring 7. The flow guiding surface 12 is formed at least partially by the second face 39 of the separating wall 14 of the base member 2. The flow guiding surface 12 is at least partially formed by the separating wall 14 of the base member 2. The separating wall 14 extends circumferentially about axis of rotation 100 between the annular wall 8 and the outer wall 15 of the base member 2. On the second side 10 of the base member 2 where the separating wall 14 is part of the flow guiding surface 12, the flow guiding elements 11 are arranged on the separating wall 14. The separating wall 14 has a thickness t measured in the direction of the axis of rotation 100. The thickness t of the separating wall 14 is constant in the embodiment. The first face 38 of the separating wall 14 extends at least partially parallel to the second face 39 of the separating wall 14. The flow guiding surface 12 extends on the second face 39 of the separating wall 14. A contour of the separating wall 14 on the first side 9 of the base member 2 follows a contour of the flow guiding surface 12 on the second side 10 of the base member 2.

The first face 38 of the separating wall 14 forms the bottom for the receptacle 51 in the base member 2. The receptacle 51 serves for receiving the inertia ring 6. The inertia ring 6 is arranged on the bottom of the receptacle 51 or arranged to rest on knobs 41 (FIG. 7) on the bottom of the receptacle 51 in the base member 2. The inertia ring 6 comprises a first side face 74 and a second side face 16. The second side face 16 of the inertia ring 6 is facing the base member 2. The second side face 16 of the inertia ring 6 is facing the first face 38 of the separating wall 14. In the assembled state of the blower wheel 1, a contour of the second side face 16 of the inertia ring 6 follows the contour of the first face 38 of the separating wall 14 at least partially.

The inertia ring 6 comprises first side face 74. The first side face 74 is facing away from the base member 2. The first side face 74 in the embodiment is of a planar configuration and is positioned approximately in a plane which is substantially perpendicular to the axis of rotation 100.

The inertia ring 6 comprises a thickness s1 measured in the direction of the axis of rotation 100. The thickness s1 is measured at the outer radius rat of the inertia ring 6. The inertia ring 6 comprises a thickness s2 measured in the direction of the axis of rotation 100. The thickness s2 is measured at the inner radius rit of the inertia ring 6. The thickness s1 of the inertia ring 6 relative to the axis of rotation 100 is preferably positioned radially farther outwardly, i.e., measured at a greater radial distance to the axis of rotation 100 than the thickness s2. The thickness s1 is smaller than the thickness s2. The inertia ring 6 comprises at least one section in which the thickness s1, s2 of the inertia ring 6 that is measured in the direction of the axis of rotation 100 decreases in radial direction outwardly. The thickness of the inertia ring 6 decreases advantageously continuously from the inner radius rit toward the outer radius rat. The thickness s1 of the inertia ring 6 at the outer radius rat of the inertia ring 6 is advantageously approximately 60% to approximately 80%, in particular approximately 70%, of the thickness s2 at the inner radius rit of the inertia ring 6.

The side face 16 of the inertia ring 6 extends conically. As is shown in FIGS. 7 and 9, the side face 16 is resting on the knobs 41 of the first face 38 of the separating wall 14. By interaction of the three-point support on the knobs 41 and the support of the conical side face of the inertia ring 6 on the knobs 41, the inertia ring 6 is centered on the base member 2. A different course of the side face 16, for example, a convex or concave course, can however be advantageous also.

Figure 10:
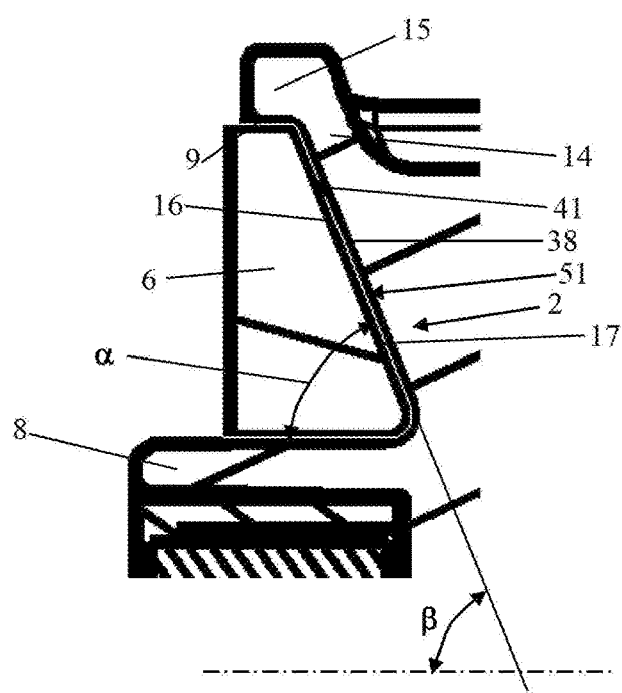
FIG. 10 is an enlarged partial illustration of the section illustration of FIG. 9.

FIG. 10 shows an enlarged detail illustration of the receptacle 51 for the inertia ring 6 of FIG. 9. A gap is formed between the first face 38 of the separating wall 14 and the second side face 16 of the inertia ring 6. The gap is illustrated in FIG. 10 with a white line. The gap is filled with adhesive 17. The inertia ring 6 is attached to the base member 2 by means of the adhesive 17. The gap between the second side face 16 and the first face 38 of the separating wall 14 is bridged in the example by a knob 41. At the location where the knob 41 is positioned, the white line which illustrates the gap between the second side face 16 and the first face 38 of the separating wall 14 is colored black. The gap extends also between the inertia ring 6 and the annular wall 8 and is also filled with the adhesive 17 in this area. The gap extends also between the inertia ring 6 and the outer wall 15 of the base member 2 and is preferably also filled with adhesive 17 in this area. Relative to the annular wall 8 as well as to the outer wall 15, the inertia ring 6 advantageously has clearance in radial direction. The gap that is formed between the inertia ring 6 and the base member 2 at the first face 38 of the separating wall 14, the annular wall 8, and the outer wall 15 is advantageously at least partially filled, preferably filled approximately flush up to the first side face 74, with the adhesive 17. The inertia ring 6 immediately contacts the base member 2 only by means of the three knobs 41. The gap forms a space for the adhesive 17. The inertia ring 6 is resting on the adhesive 17 and/or on the knobs 41.

The first face 38 of the separating wall 14 in the embodiment is slanted relative to the annular wall 8 at an angle α that is smaller than 90°. The angle α in this context is measured relative to the outwardly positioned side 70 of the annular wall 8 in a section plane that contains the axis of rotation 100. The angle α advantageously amounts to 50° to 85°, in particular 60° to 80°. The outwardly positioned side 70 of the annular wall 8 extends advantageously parallel to the axis of rotation 100.

The first face 38 of the separating wall 14 is slanted relative to the axis of rotation 100 at an angle β that is smaller than 90°. In this context, the angle β is measured in a section plane which contains the axis of rotation 100. The angle β advantageously amounts to 50° to 85°, in particular 60° to 80°. Advantageously, the angles α and β are identical.

The contour of the side of the inertia ring 6 which is facing the separating wall 14 follows the contour of the first face 38 of the separating wall 14. In this way, an approximately triangular, outwardly narrowing cross-section of the inertia ring 6 is created.

Figure 11:
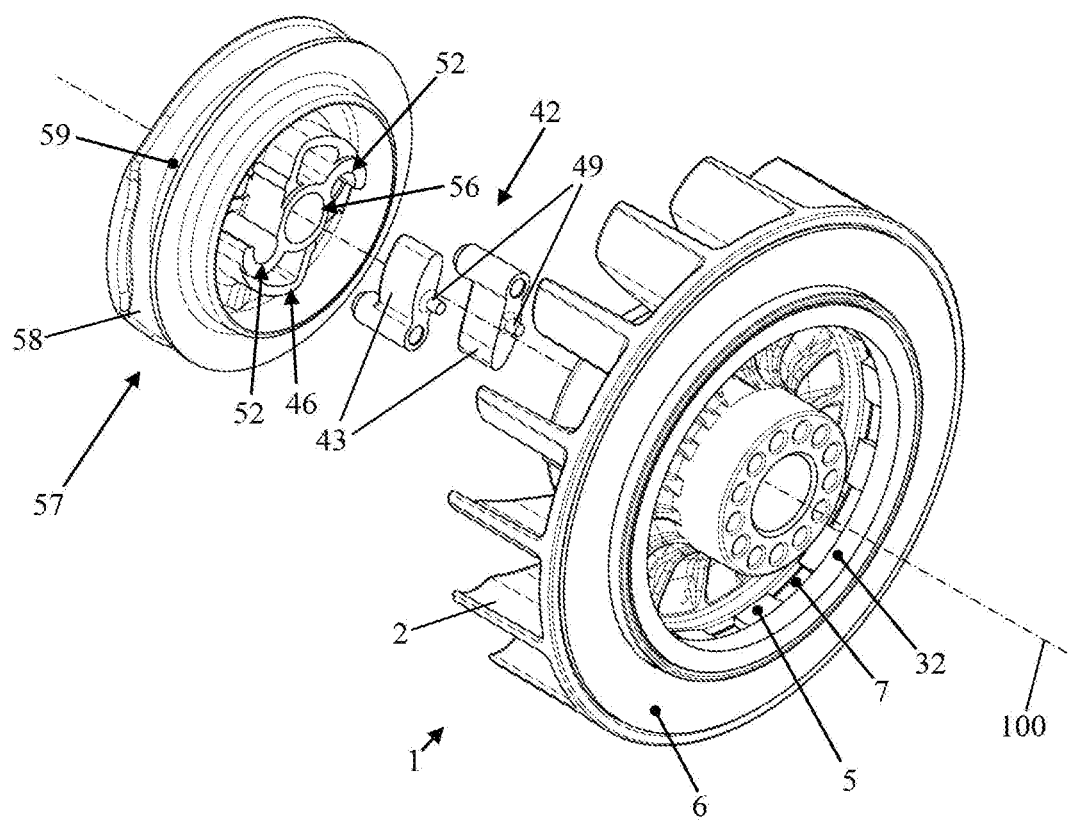
FIG. 11 is an exploded illustration of the blower wheel of FIG. 4 and of a starter device.

FIG. 11 shows an exploded illustration of parts of the starter device 57 and of the blower wheel 1 according to FIG. 4. The starter device 57 can be coupled by means of a coupling device 42, illustrated in more detail in FIG. 12, with the blower wheel 1. The starter device 57 comprises a cable drum 58. As illustrated in FIG. 11, the cable drum 58 comprises a groove 59 in which a starter cable, not illustrated, is wound up. The starter cable is connected with one end to the cable drum 58 and with the other end to the starter grip 23 illustrated in FIG. 1 so that the cable drum 58, by pulling the starter grip 23, can be caused to rotate by hand. The starter device 57 comprises follower 46. The follower 46 is facing the blower wheel 1. The follower 46 comprises two oppositely positioned receptacles 52 in which a pawl 43 is pivotably supported, respectively. The pawls 43 serve for coupling to the blower wheel 1. Each pawl 43 comprises an actuating pin 49. Pivoting of the pawls 43 can be caused by the actuating pins 49. For receiving the followers 46 and the pawls 43, the base member 2 of the blower wheel 1 comprises the receptacle 55 illustrated in FIGS. 4 and 13.

Figure 12:
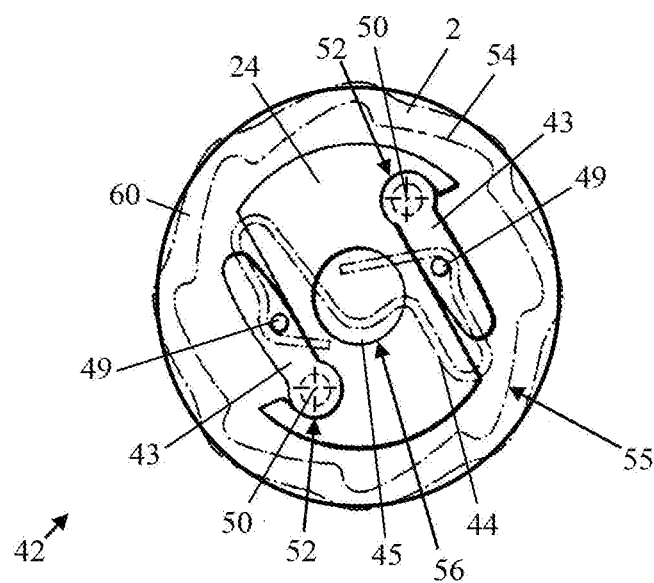
FIG. 12 is a schematic illustration of a coupling device of the starter device and of the blower wheel according to FIG. 11.

FIG. 12 shows schematically the actuation of the coupling device 42. The pawls 43 are secured by means of a spring clip 44 on a bearing shaft 45 of the starter device 57. The bearing shaft 44 is fixedly secured on the motor housing 36 illustrated in FIG. 1. As illustrated in FIG. 12, the starter device 57 comprises a central receptacle 56 for receiving the bearing shaft 45. In the assembled state, the central receptacle 56 extends in the area of the axis of rotation 100 and penetrates the starter device 57 completely. The cable drum 58 and the follower 46 are rotatable relative to the bearing shaft 45. The spring clip 44 has a cam contour. Upon relative movement of the follower 46 relative to the bearing shaft 45, the actuating pins 49 move within the spring clip 44 because the spring clip 44 is clamped on the bearing shaft 45 frictionally. As a result of the contour of the spring clip 44, the pawls 43 are pivoted outwardly. The pawls 43 pivot about pivot axes 50. The pivot axes 50 are positioned within the area of the receptacles 52 of the follower 46 and extend parallel to the axis of rotation 100.

The receptacle 55 of the base member 2 of the blower wheel 1 is substantially hollow-cylindrical. In the assembled state, the longitudinal cylinder axis coincides with the axis of rotation 100. The receptacle 55 comprises a sidewall 60. The inner surface of the sidewall 60 of the receptacle 55 which is positioned opposite the outer circumferential surface of the hollow cylinder of the receptacle 55 comprises preferably a cam contour 54. In the outwardly pivoted state, the pawls 43 engage the cam contour 54. In this way, a rotationally fixed coupling of the follower 46 with the base member 2 and the blower wheel 1 and thus with the crankshaft 27 of the internal combustion engine 19 illustrated in FIG. 3 is achieved.

Figure 13:
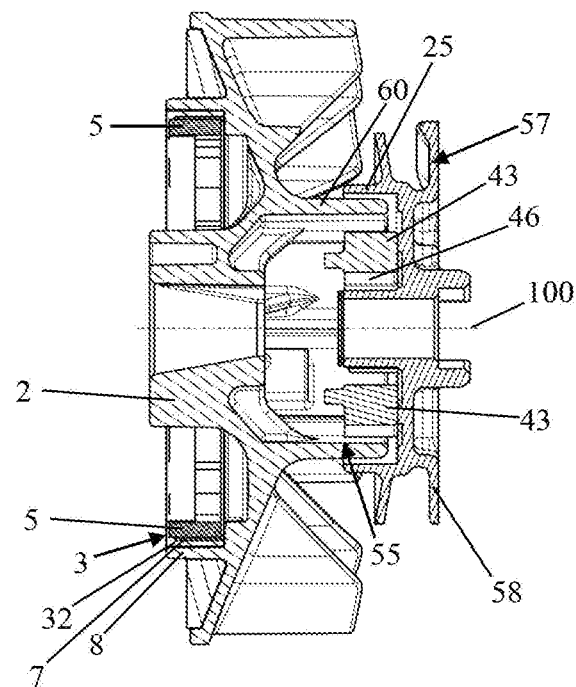
FIG. 13 is a section view of the blower wheel and of the starter device of FIG. 11 in the assembled state.

FIG. 13 shows a section through the base member 2 and the starter device 57 in the assembled state. The follower 46 with its pawls 43 is almost completely arranged within the receptacle 55 of the base member 2 of the blower wheel 1. The starter device 57 comprises a cylinder wall 25. In the assembled state, the cylinder wall 25 is located radially outside of the sidewall 60 of the receptacle 55. The cylinder wall 25 engages across the sidewall 60. The follower 46 with its pawls 43 is arranged radially within the cylinder wall 25 and the sidewall 60. Accordingly, the pawls 43 are protected from becoming soiled.

Figure 14:
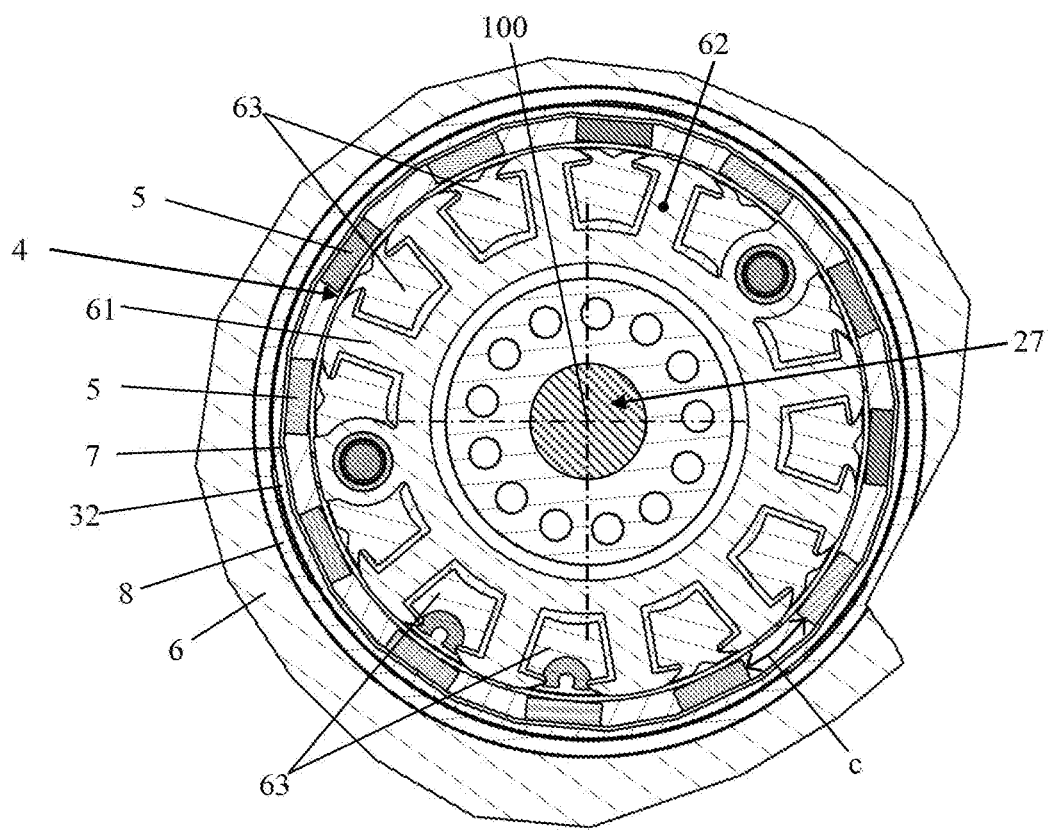
FIG. 14 is a schematic partial illustration of a section view perpendicular to the axis of rotation through a generator, the magnetic return ring, and the base member of the blower wheel according to FIG. 4.

FIG. 14 shows a section view perpendicular to the axis of rotation 100 through the generator 4, the magnetic return ring 7, the base member 2, and the crankshaft 27. The generator 4 comprises the stator 20 and the rotor 3. The generator 4 in the embodiment is designed as a claw pole generator. Between the claws of the stator 20 of the generator 4, mushroom heads 62 of the stator 20 are arranged. The longitudinal directions of the mushroom heads 62 extend radially relative to the axis of rotation 100. The head parts of the mushroom heads 62 are positioned outwardly in radial direction relative to the axis of rotation. The mushroom heads 62 have stem-shaped sections about which coils 63 are wound. The magnets 5 generate voltage in the coils 63 in operation. The magnets 5 are arranged at regular spacings c relative to each other on the magnetic return ring 7. The magnetic return ring 7 is at least partially surrounded by a fastening ring 32. The fastening ring 32 is contacting (resting on) the annular wall 8. The fastening ring 32 is arranged radially within the annular wall 8. The fastening ring 32 separates the magnetic return ring 7 from the annular wall 8.

The specification incorporates by reference the entire disclosure of German priority document 10 2015 016 482.1 having a filing date of Dec. 15, 2015.

While specific embodiments of the invention have been shown and described in detail to illustrate the inventive principles, it will be understood that the invention may be embodied otherwise without departing from such principles.

What is claimed is:

1. A blower wheel comprising:
a base member having an axis of rotation;
a rotor of a generator, wherein the rotor is fixedly secured on the blower wheel;
at least one magnet arranged on the rotor;
an inertia ring fixedly secured on the base member at a spacing to the at least one magnet;
wherein the inertia ring is made of a first material having a first density and wherein the base member is made of a second material having a second density;
wherein the first density is greater than the second density.

2. The blower wheel according to claim 1, wherein the inertia ring comprises at least one section in which a thickness of the inertia ring measured in a direction of the axis of rotation decreases in a radial outward direction relative to the axis of rotation.

3. The blower wheel according to claim 1, wherein the inertia ring is attached by an adhesive to the base member.

4. The blower wheel according to claim 1, wherein the rotor is fixedly secured on the base member of the blower wheel.

5. The blower wheel according to claim 1, wherein the inertia ring is a closed continuous ring extending concentrically about the axis of rotation of the base member.

6. The blower wheel according to claim 1, further comprising a metallic magnetic return ring configured to reinforce a magnetic flux of the at least one magnet.

7. The blower wheel according to claim 6, wherein the inertia ring is arranged radially outside of the metallic magnetic return ring in a radial direction relative to the axis of rotation.

8. The blower wheel according to claim 1, wherein the base member comprises an annular wall arranged on one side of the base member, wherein the annular wall extends in an annular shape about the axis of rotation, and wherein the at least one magnet is arranged radially inside the annular wall in a radial direction relative to the axis of rotation.

9. The blower wheel according to claim 8, wherein the inertia ring is arranged outside of the annular wall in the radial direction.

10. The blower wheel according to claim 1, wherein the base member comprises a first side and a second side, wherein the first side and the second side face in opposite axial directions relative to the axis of rotation, and further comprises flow guiding elements that are arranged on the second side of the base member.

11. The blower wheel according to claim 10, wherein the inertia ring is arranged on the first side of the base member.

12. The blower wheel according to claim 10, wherein the flow guiding elements are arranged in a circular ring area of the base member, wherein the circular ring area has a center point positioned on the axis of rotation, wherein an inner radius of the circular ring area corresponds to at most 0.5 times an outer radius of the base member, wherein an outer radius of the circular ring area corresponds to at least 0.9 times the outer radius of the base member.

13. A blower wheel comprising:
a base member having an axis of rotation;
a rotor of a generator, wherein the rotor is fixedly secured on the blower wheel;
at least one magnet arranged on the rotor;
an inertia ring fixedly secured on the base member at a spacing to the at least one magnet;
wherein the inertia ring is made of a first material having a first density and wherein the base member is made of a second material having a second density;
wherein the first density is greater than the second density;
wherein the base member comprises a first side and a second side, wherein the first side and the second side face in opposite axial directions relative to the axis of rotation, and further comprises flow guiding elements that are arranged on the second side of the base member;
wherein the base member has an imaginary terminal plane positioned perpendicular to the axis of rotation, wherein the imaginary terminal plane is arranged on the first side of the base member, wherein the imaginary terminal plane extends through an outermost boundary of the base member provided in the axial direction, wherein the base member on the second side of the base member comprises a flow guiding surface, and wherein a first measured spacing of the flow guiding surface, measured relative to the imaginary terminal plane, increases as a second measured spacing of the flow guiding surface, measured in a radial direction relative to the axis of rotation, decreases.

14. The blower wheel according to claim 13, wherein the rotor is fixedly secured on the base member of the blower wheel.

15. The blower wheel according to claim 13, wherein the inertia ring is a closed continuous ring extending concentrically about the axis of rotation of the base member.

16. The blower wheel according to claim 13, wherein, on a side of the inertia ring that is facing the flow guiding surface, a contour of the inertia ring follows a contour of the flow guiding surface.

17. The blower wheel according to claim 13, wherein, between the first side and the second side of the base member, a separating wall is arranged and wherein the inertia ring is arranged adjacent to the separating wall.

18. The blower wheel according to claim 17, wherein the flow guiding surface is formed at least partially by the separating wall of the base member.

19. The blower wheel according to claim 17, wherein a contour of the separating wall on the first side of the base member follows a contour of the flow guiding surface on the second side of the base member.

20. A power tool comprising:
an internal combustion engine;
a blower wheel comprising:
a base member having an axis of rotation;
a rotor of a generator, wherein the rotor is fixedly secured on the blower wheel;
at least one magnet arranged on the rotor;
an inertia ring fixedly secured on the base member at a spacing to the at least one magnet, wherein the inertia ring is made of a first material having a first density and the base member is made of a second material having a second density, wherein the first density is greater than the second density.

21. The power tool according to claim 20, wherein the rotor is fixedly secured on the base member of the blower wheel.

22. The power tool according to claim 20, wherein the inertia ring is a closed continuous ring extending concentrically about the axis of rotation of the base member.

* * * * *